US009621381B2

(12) United States Patent
Kim et al.

(10) Patent No.: US 9,621,381 B2
(45) Date of Patent: Apr. 11, 2017

(54) COMMUNICATION APPARATUS AND METHOD FOR HIGH EFFICIENCY SATELLITE SERVICE

(71) Applicant: ELECTRONICS AND TELECOMMUNICATIONS RESEARCH INSTITUTE, Daejeon (KR)

(72) Inventors: Pan Soo Kim, Daejeon (KR); Deock Gil Oh, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 14/609,759

(22) Filed: Jan. 30, 2015

(65) Prior Publication Data

US 2015/0333936 A1 Nov. 19, 2015

(30) Foreign Application Priority Data

May 19, 2014 (KR) .................. 10-2014-0059505

(51) Int. Cl.
H04L 25/03 (2006.01)

(52) U.S. Cl.
CPC .... H04L 25/03038 (2013.01); H04L 25/0328 (2013.01); H04L 25/03057 (2013.01);
(Continued)

(58) Field of Classification Search
CPC ... H03H 7/30; H03H 7/40; H04B 1/38; H04B 7/00; H04B 7/14; H04B 15/00;
(Continued)

(56) References Cited

U.S. PATENT DOCUMENTS

| 6,850,563 B1 * | 2/2005 | Hulyalkar et al. ............ 375/233 |
| 7,409,024 B2 * | 8/2008 | Ginesi ................. H04L 27/0014 375/362 |

(Continued)

FOREIGN PATENT DOCUMENTS

KR 20120017392 A 2/2012

OTHER PUBLICATIONS

C. Cioni, et al; "Bandwidth Optimization for Satellite Digital Broadcasting", 31st AIAA International Communications Satellite Systems Conference at Florence Italy, Oct. 14-17, 2013, 8 pages.
(Continued)

Primary Examiner — Shawkat M Ali
(74) Attorney, Agent, or Firm — Ladas & Parry LLP

(57) ABSTRACT

Disclosed are a communication apparatus and a communication method capable of improving transmitting/receiving frequency efficiency of a satellite signal per bandwidth or spectral efficiency (S.E) per bandwidth by removing and improving a distortion or inter-symbol interference for applying a minimum-mean square error (MMSE) equalizer required to detect a frame synchronization and a modulation code rate in a satellite service for satellite broadcasting or communication under the variable coding and modulation (VCM) or adaptive coding and modulation (ACM) environment.

17 Claims, 8 Drawing Sheets

(52) U.S. Cl.
CPC .............. *H04L 2025/03484* (2013.01); *H04L 2025/03636* (2013.01); *H04L 2025/03675* (2013.01); *H04L 2025/03726* (2013.01)

(58) Field of Classification Search
CPC ........ H04J 3/00; H04J 3/04; H04J 3/22; H04J 11/00; H04L 1/00; H04L 25/03057; H04L 25/0328; H04L 25/20; H04L 27/00; H04L 27/01; H04L 27/28; H04L 27/30; H04L 25/03; H04L 2025/03484; H04W 4/00
USPC ........ 370/210, 315, 328, 535; 375/130, 214, 375/229, 232, 233, 260, 267, 316, 346; 455/12.1, 502; 714/54, 752, 776
See application file for complete search history.

(56) References Cited

U.S. PATENT DOCUMENTS

| | | | |
|---|---|---|---|
| 7,675,968 B2* | 3/2010 | Takatori et al. ............. | 375/232 |
| 8,204,164 B1* | 6/2012 | Furman ............ | H04L 25/03038 327/551 |
| 8,428,113 B1* | 4/2013 | Katic et al. ................... | 375/232 |
| 2002/0196844 A1* | 12/2002 | Rafie et al. ................... | 375/232 |
| 2004/0228398 A1* | 11/2004 | Kim et al. ..................... | 375/232 |
| 2006/0215748 A1* | 9/2006 | Xia et al. ...................... | 375/233 |
| 2009/0016422 A1* | 1/2009 | Zhong et al. ................. | 375/233 |
| 2009/0103669 A1* | 4/2009 | Kolze et al. .................. | 375/346 |
| 2010/0046415 A1* | 2/2010 | Kim et al. ..................... | 370/315 |
| 2011/0188550 A1 | 8/2011 | Wajcer et al. | |
| 2012/0214524 A1* | 8/2012 | Wajcer et al. ................ | 455/502 |
| 2013/0315346 A1* | 11/2013 | Varma et al. ................. | 375/316 |
| 2015/0010118 A1* | 1/2015 | Beidas ............. | H04L 25/03006 375/341 |

OTHER PUBLICATIONS

E. Casini, et al; "DVB-S2 modem algorithms design and performance over typical satellite channels", International Journal of Satellite Communications and Networking, vol. 22, Issue 3, pp. 281-318 May/Jun. 2004; Article first published online: Jun. 16, 2004.

* cited by examiner

COMMUNICATION APPARATUS AND METHOD FOR HIGH EFFICIENCY SATELLITE SERVICE

CROSS-REFERENCE TO RELATED APPLICATIONS

This application claims priority to and the benefit of Korean Patent Application No. 10-2014-0059505 filed in the Korean Intellectual Property Office on May 19, 2014, the entire contents of which are incorporated herein by reference.

TECHNICAL FIELD

The present invention relates to a communication apparatus and method for satellite service, and more particularly, to a communication apparatus and method capable of improving transmitting and receiving frequency efficiency or spectral efficiency (S.E) of a satellite signal per bandwidth, compared to those of the existing technology.

BACKGROUND ART

In the case of one-to-one communication or one-to-multi communication in the traditional digital communication system, an application of Shannon's theory has a limitation in transmission capacity. Further, to receive a transmission signal without interference in transmission/reception, data needs to be transmitted based on a Nyquist rate to be able to perfectly recover the received signal without inter-symbol interference. Recently, in the case of satellite broadcasting and communication, a technology of improving spectral efficiency (S.E) compared to that of the existing technology has been proposed.

For example, technologies of increasing transmission capacity by adding a pre-distorter to a transmitter and an equalizer to a receiver in a digital video broadcasting (DVB)-satellite second generation (S2) modem structure or the DVB-S2 modem have been present in the past. However, the conventional technologies have a problem on how a minimum-mean square error (MMSE) equalizer is applied under the variable coding and modulation (VCM) or adaptive coding and modulation environment in which a frame length and a modulation scheme are changed in each frame unit. Further, the 42 tap MMSE equalizer has complexity of multiplication. Further, the existing MMSE adaptive equalizer is operated based on a data-aided (DA) mode using an appropriate training sequence (known data/pilot symbol) based on a simple least mean square (LMS) algorithm, but has a limitation in the application under the VCM/ACM environment.

Here, to improve the transmitting and receiving frequency efficiency or the spectral efficiency (S.E), the spectral efficiency per bandwidth may be generally improved by reducing a roll off (RO) of a baseband filter as represented by the following Equation 1. In the following Equation, RS represents a symbol rate, r represents a coding rate of a channel code, M represents a modulation order (for example, 4 for QPSK, 8 for 8PSK), and W represents a bandwidth, in which $W=Rs*(1+R0)$ and as the roll off (RO) is reduced, the spectral efficiency is increased.

$$S.E.=R_s \times r \times \log_2(M)/W \qquad \text{[Equation 1]}$$

For example, to avoid a channel distortion in a channel in which a bandwidth of a transponder is about 100 MHz (−3 dB bandwidth), if it is assumed that the roll off (RO) is set to be 0.2, the distortion may be avoided when the transmission is made at a symbol rate of 83.33 MHz. However, when the transmission is made at the symbol rate of 83.33 MHz or more, the distortion occurs. Further, as the symbol rate is increased, a bandwidth of a carrier is increased and inter-symbol interference occurs due to a group delay characteristic, and therefore a need exists for a method for overcoming the above problem. Generally, the transponder is configured of an input multiplex (IMUX) filter, an amplifier, and an output multiplexer (OMUX) filter, in which since the IMUX filter has a larger bandwidth than that of OMUX filter, it is more important to compensate for a distortion of the OMUX filter than a distortion of the IMUX filter. A distortion of the amplifier is almost perfectly compensated by performing a pre-distortion when characteristics of the amplifier are known and therefore it is assumed that a non-linear distortion due to the amplifier is not almost present.

However, in the VCM/ACM environment, there is a need to detect a frame synchronization such as a start of frame and a pilot symbol, a modulation code rate (MODCOD), and the like; however, when the distortion, the inter-symbol interference, or the like is present, it is impossible to detect frame synchronization or the MODCOD. For example, when there are no inter-channel interference and additive white Gaussian noise (AWGN), as illustrated in FIG. 1A, normal 16 APSK (amplitude phase shift keying) transmission/reception is possible, but as illustrated in FIG. 1B, when even though the AWGN noise is not present, the inter-symbol interference is present, a signal to interference ratio (SIR) is reduced to 6.4 dB and thus constellation identification is difficult, such that it is impossible to detect the frame synchronization and the MODCOD.

SUMMARY OF THE INVENTION

The present invention has been made in an effort to provide a communication apparatus and method capable of improving transmitting/receiving frequency efficiency of a satellite signal per bandwidth or spectral efficiency (S.E) per bandwidth by removing and improving a distortion or inter-symbol interference for applying a minimum-mean square error (MMSE) equalizer required to detect a frame synchronization and a modulation code rate in a satellite service for satellite broadcasting or communication under the variable coding and modulation (VCM) or adaptive coding and modulation (ACM) environment in which a frame length and a modulation scheme are changed in each frame unit.

An exemplary embodiment of the present invention provides a communication apparatus, including: an equalizer configured to receive an oversampled sample to perform equalization of a frequency band based on finite impulse response (FIR) filtering and output a decimated sample; a receiving state estimation unit configured to receive the decimated sample to detect information on a transmission scheme and generate a mode switching signal at a synchronization timing depending on the corresponding modulation scheme and a frame length; and a filter update processing unit configured to allow a separate second equalizer to receive the oversampled sample from the equalizer to perform the equalization of the frequency band and use generated data to update tap coefficients for the FIR filtering and provide the updated tap coefficients to the equalizer and be switched from a blind mode to a data-aided (DA) mode depending on the mode switching signal to perform the update of the tap coefficients.

In the viewpoint of a 3 dB bandwidth, the communication apparatus may correct a signal distortion in a channel using a band in which a bandwidth of a transmission signal carrier is larger than a bandwidth of a filter to which the communication apparatus is applied in a predetermined range or a channel in which a linear distortion characteristic of filter pass is serious to increase a symbol rate.

The filter may be a satellite transponder filter and the predetermined range may include a range in which a roll off (RO) for a bandwidth W and a symbol rate Rs of a carrier in W=Rs*(1+RO) is set to be 0 to 0.2.

Information on the transmission scheme may be modulation code rate (MODCOD) information. The communication apparatus may receive a satellite signal in variable coding and modulation (VCM) or adaptive coding and modulation (ACM) environment. The communication apparatus may be applied a digital video broadcasting (DVB) modem.

The filter update processing unit may be implemented by a separate digital signal processing (DSP) chip.

The oversampled sample may be configured of two oversamples and the decimated sample may be configured of 1 sample per symbol.

The filter update processing unit may include: an update IR configured to calculate an error corresponding to an error between an output of the second equalizer and an output signal power value to update the tap coefficients in the corresponding mode; and a Ref symbol control unit configured to allow the update IR to provide data to be used for the calculation of the error in the DA mode.

The Ref symbol control unit may include: a level and phase shifter configured to provide the data generated by shifting a level and a phase of a reference symbol depending on a control signal generated based on the decimated sample in the receiving state estimation unit.

Another exemplary embodiment of the present invention provides a signal receiving method of a communication apparatus, including: receiving, by an equalizer, an oversampled sample to perform equalization of a frequency band based on finite impulse response (FIR) filtering and output a decimated sample; receiving the decimated sample to detect information on a transmission scheme and generating a mode switching signal at a synchronization timing depending on the corresponding modulation scheme and a frame length; and performing, by a separate second equalizer receiving the oversampled sample from the equalizer, equalization of a frequency band and using generated data to update tap coefficients for the FIR filtering and provide the updated tap coefficients to the equalizer and be switched from a blind mode to a data-aided (DA) mode depending on the mode switching signal to perform the update of the tap coefficients.

In the viewpoint of a 3 dB bandwidth, the communication apparatus may correct a signal distortion in a channel using a band in which a bandwidth of a transmission signal carrier is larger than a bandwidth of a filter to which the communication apparatus is applied in a predetermined range or a channel in which a linear distortion characteristic of filter pass is serious to increase a symbol rate.

The filter may be a satellite transponder filter and the predetermined range may include a range in which a roll off (RO) for a bandwidth W and a symbol rate Rs of a carrier in W=Rs*(1+RO) is set to be 0 to 0.2.

Information on the transmission scheme may be modulation code rate (MODCOD) information.

The communication apparatus may receive a satellite signal in variable coding and modulation (VCM) or adaptive coding and modulation (ACM) environment.

The oversampled sample may be configured of two oversamples and the decimated sample may be configured of 1 sample per symbol.

In the performing of the update of the tap coefficients, an error corresponding to an error between an output of the second equalizer and an output signal power value may be calculated to update the tap coefficients in the corresponding mode; and data generated by shifting a level and a phase of a reference symbol depending on a control signal generated based on the decimated sample may be used for the calculation of the error to update the tap coefficients in the DA mode.

According to the communication apparatus and method according to the exemplary embodiments of the present invention, it is possible to remove the distortion or the inter-symbol interference of the satellite service signal for satellite broadcasting or communication and improve the transmitting/receiving frequency efficiency or the spectral efficiency (S.E) of the satellite signal per bandwidth by applying the equalization technology to detect the frame synchronization and the MODCOD even under the VCM/ACM environment.

Figure 1A:
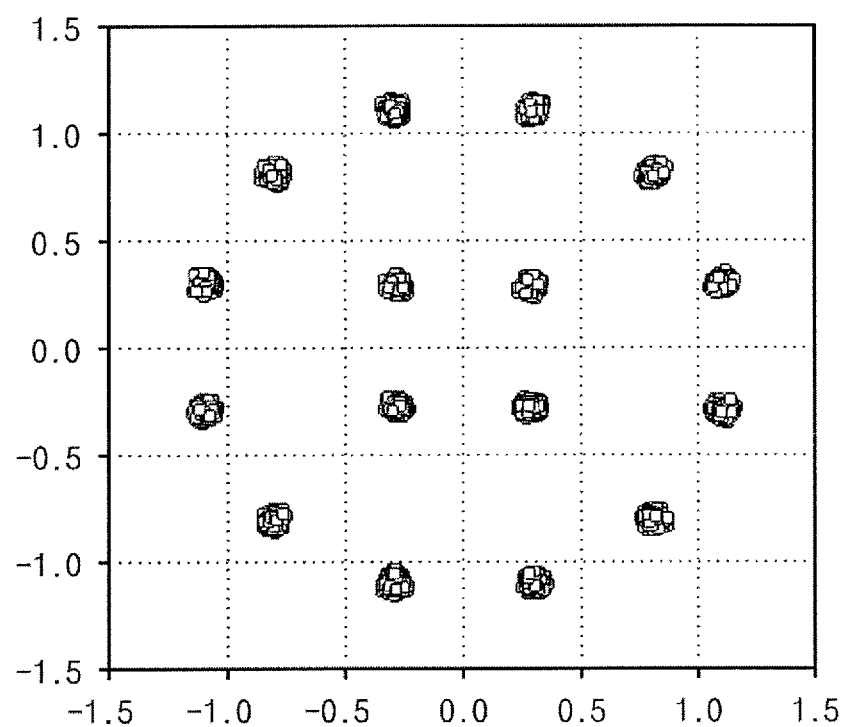
FIG. 1A is a diagram illustrating normal 16 APSK constellation in a general communication apparatus.
Figure 1B:
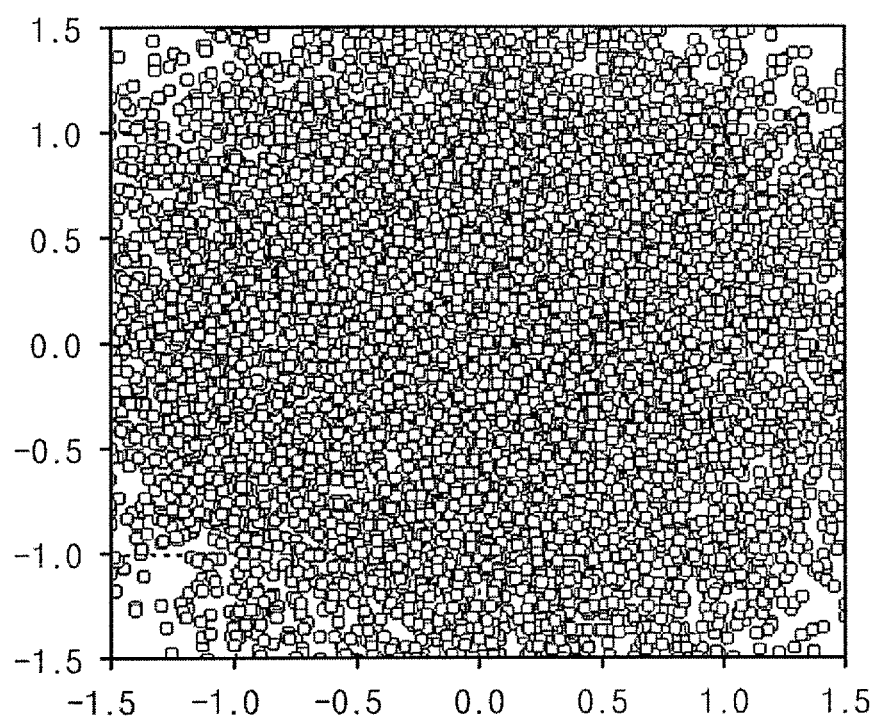
FIG. 1B is a diagram illustrating 16 APSK constellation when the inter-symbol interference is present in a general communication apparatus.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

In the figures, reference numbers refer to the same or equivalent parts of the present invention throughout the several figures of the drawing.

Hereinafter, the present invention will be described in detail with reference to the accompanying drawings. In this case, like reference numerals refer to like elements in the respective drawings. Further, a detailed description of an already known function and/or configuration will be skipped. In contents disclosed hereinbelow, a part required for understanding an operation according to various exemplary embodiments will be described by priority and a description of elements which may obscure the spirit of the present invention will be skipped.

Figure 2:
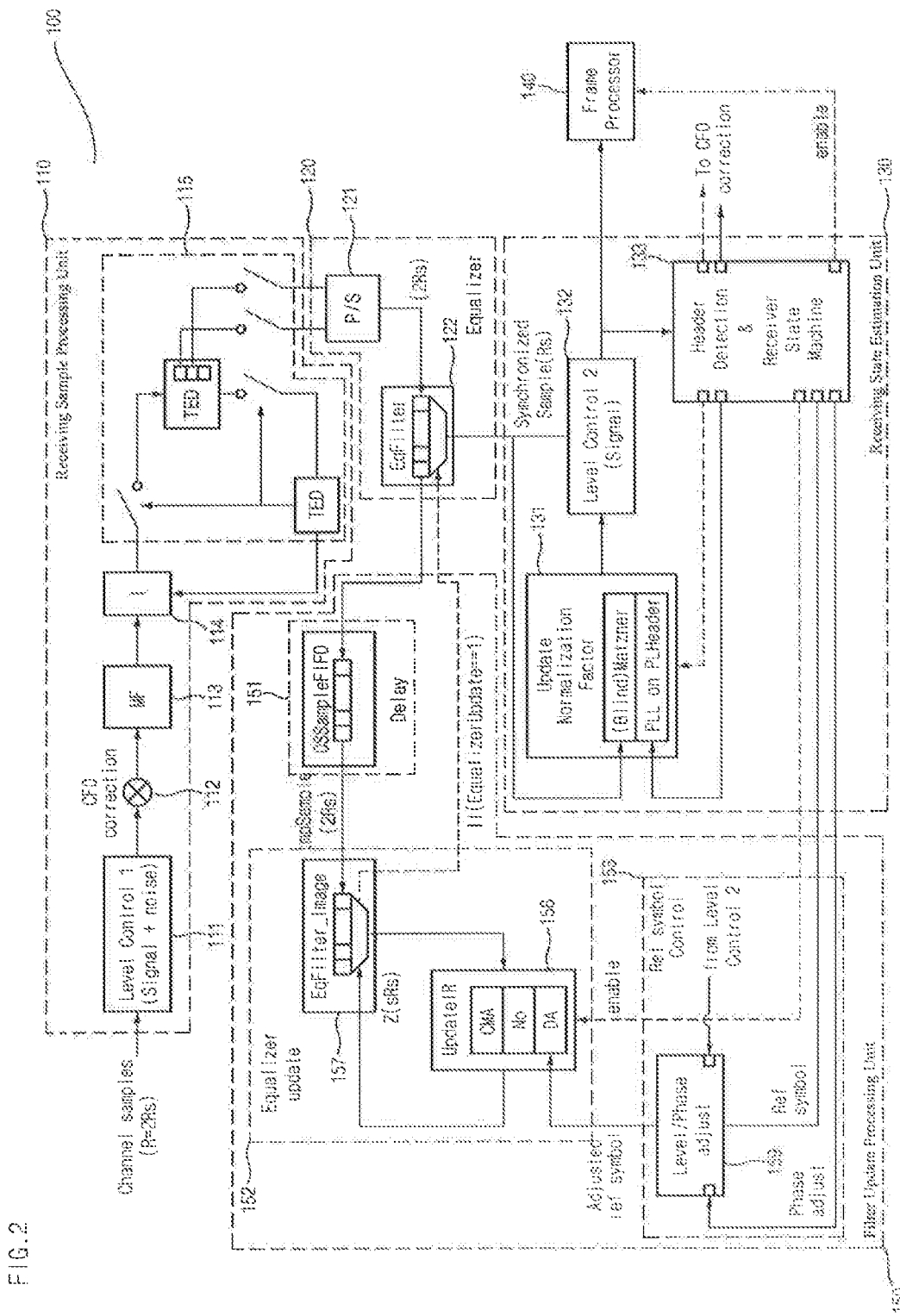
FIG. 2 is a diagram for describing a communication apparatus for satellite service according to an exemplary embodiment of the present invention.

FIG. 2 is a diagram for describing a communication apparatus 100 for receiving a satellite signal for satellite service according to an exemplary embodiment of the present invention. Referring to FIG. 2, the communication apparatus 100 according to the exemplary embodiment of the present invention includes a receiving sample processing unit 110, an equalizer 120, a receiving state estimation unit 130, a frame processor 140, and a filter update processing unit 150.

The receiving sample processing unit 110 includes a first level control unit 111, a carrier frequency offset correction unit 112, a matched filter 113, an interpolation filter 114 for symbol synchronization, and a symbol synchronous block 115.

The equalizer 120 includes a serial-parallel converter (P/S) 121 and an Eqfilter (equalizer filter) 122.

The receiving state estimation unit 130 includes an update normalization factor unit 131, a second level control unit 132, a header detection and receiver state machine unit 133.

The filter update processing unit 150 includes a buffer 151, an equalizer tap coefficient update unit 152, and a Ref symbol control unit 153.

First, the receiving sample processing unit 110 receives a signal for satellite service for satellite broadcasting or communication under variable coding and modulation (VCM) or adaptive coding and modulation (ACM) environment and performs noise removal such as AWGN, inter-symbol interference (ISI) removal, timing error correction, and the like on the received signal and then outputs the received signal to the equalizer 120. For example, a physical layer (PL) frame forming the received signal for satellite service is configured of a plurality of slots according to a transmission scheme, in which each slot may be configured of 90 symbols and PL header information or physical layer signaling (PLS) information included in a first slot of each frame is configured of start of frame (SOF) information, MODCOD information as information on the transmission type, a type information for informing whether a pilot is present, and the like each of which are configured of a predetermined symbol.

In the receiving sample processing unit 110, the first level control unit 111 receives a signal for satellite service for satellite broadcasting or communication under the VCM/ACM environment in which a frame length and a modulation scheme are changed in each frame unit to correct a signal level depending on a predetermined error correction algorithm. Here, the received signal may be configured of 2 oversamples per symbol.

A CFO correction unit 112 corrects a CFO (carrier frequency offset) for an output of the first level control unit 111 and performs the CFO correction depending on a predetermined control signal which is generated after the header detection and receiver state machine unit 133 completes a frequency error calculation.

The matched filter 113 removes the noise such as AWGN of the signal passing through the first level control unit 111 or the CFO correction unit 112. In this case, a square root raised cosine (SRRC) filter may be used. The matched filter 113 removes a predetermined amount of inter-symbol interference which is associated with a transmitting filter. Here, the inter-symbol interference occurring due to a channel response is in a non-removed state, which may be removed as follows.

The symbol synchronous block 115 corrects a timing error for the output of the interpolation filter unit 114 and outputs the corrected timing error to the equalizer 120. The interpolation filter unit 114 serves to resample a timing error correction value calculated by the symbol synchronous block 115.

The symbol synchronous block 115 uses a timing error detector (TED) to calculate the timing error and the interpolation filter unit 114 uses an operation of resampling the timing error correction value to output a sample data of which the timing error is corrected to the equalizer 120. In this case, a timing error controller corrects a sampling timing of the sample data to perform a control to be sampled through switches, such that the sample data of which the timing error is corrected may be output, the sample data may be output in a state in which it is configured of 2 oversamples per symbol, and the sample may not be decimated.

The equalizer 120 performs equalization of frequency band characteristics to improve the inter-symbol interference and the distortion such as noise which occur due to the estimated channel response. In this case, the serial-parallel converter (P/S) 121 receives all the 2 samples per symbol received in parallel without the decimation and outputs the received samples to the EqFilter 122 in series and the EqFilter 122 uses an FIR filter tap coefficient updated by the filer update processing unit 150 to perform finite impulse response (FIR) filtering based on a feedforward scheme for equalization of the frequency band characteristics to output the decimated sample (for example, sample decimated to 1 sample per symbol) to the receiving state estimation unit 130. For example, when the Eqfilter 122 is based on a scheme using M (natural number) taps, the filter update processing unit 150 may update previous tap coefficients $W_n$ to $W_{n+1}$ depending on a least mean square (LMS) algorithm for minimum-mean square error (MMSE) as represented by the following Equation 2.

$$W_{n+1} = W_n + \mu \cdot \epsilon_n \cdot x_n^* \qquad \text{[Equation 2]}$$

In the above Equation, $W_n = \{W_{n,0}, W_{n,1}, \ldots W_{n,M-1}\}$, $\mu$ represents a step size, an input data $x_n = \{x_n, x_{n-1}, \ldots x_{n-M+1}\}$, and * represents a complex conjugate operation. Further, $\epsilon_n$ to which an error between $y_n (=x_n W_n^T)$ which is an output of the EqFilter and Rc known as a Godard radius is reflected may be defined by the following Equation 3. $R_c^2$ corresponds to a power value for a finally determined output signal s(n) and is based on an expectation (E) calculation scheme.

$$\varepsilon_n = (y_n^2 - R_c^2) \cdot y_n \qquad \text{[Equation 3]}$$

$$R_c^2 = \frac{E[|s(n)|^4]}{E[|s(n)|^2]}$$

Meanwhile, the receiving state estimation unit 130 receives the decimated sample (for example, sample decimated to 1 sample per symbol) from the equalizer 120 to calculate a signal power and performs the frame synchronization, the carrier synchronization based on a calculation of a carrier frequency error and a phase error, and the like, the modulation code rate (MODCOD) detection, and the like to perform an operation control of the CFO correction unit 112, a switching control from a blind mode of an algorithm such as a constant magnitude algorithm (CMA) to a data-aided mode in the filter update processing unit 150, an operation control of the frame process 140, and the like.

The update normalization factor unit 131 in the receiving state estimation unit 130 first uses a Matzner technique, and the like which is an SNR estimation technique of an asynchronous scheme to calculate a signal power and the second level control unit 132 corrects a signal level depending on a predetermined error correction algorithm. The second level control unit 132 may use the signal power, and the like which is calculated by the update normalization factor unit 131.

For the signal corrected by the second level control unit 132, the header detection and receiver state machine unit 133 performs the carrier synchronization using frame synchronization and the carrier synchronization by the calculation of the carrier frequency error and the phase error, and the like and performs the detection of the information on the transmission scheme included in the physical layer signaling (PLS) information, that is, the modulation coder rate (MODCOD) information to understand the information on the modulation scheme and the frame length, and the like. The header detection and receiver state machine unit 133 generates a predetermined enable signal (for example, mode switching signal) at the corresponding synchronization timing using a frame start point recognized by the detected MODCOD and other physical layer (PL) header information to allow the update normalization factor unit 131 to control the second level control unit 132 based on a data-aided (DA) mode in a PLL on PLheader block. In this case, the predetermined enable signal is also transmitted to the filter update processing unit 150, and thus controls the filter update processor 150 to be operated by switching the blind mode (non data-aided mode) of the constant magnitude algorithm (CMA) algorithm to the data-aided (DA) mode (mode using previously known data (or symbol) configured of an appropriate training sequence instead of the $R_c^2$ in the error $\epsilon_n$). Here, when the pilot symbol is present, the synchronization timing may be calculated using the pilot symbol instead of the physical layer (PL) header information, or otherwise only the physical layer (PL) information may be used.

Next, in a steady state of the communication apparatus 100 which is a receiver, a tap coefficient update operation of the equalizer is completed and thus the equalizer 120 is operated in a sleep mode, and the frame processor 140 performs a synchronization process and a low-density parity-check decoding process on the signal corrected by the second level control unit 132 according to the predetermined enable signal of the header detection and receiver state machine unit 133.

Meanwhile, the filter update processing unit 150 is a portion where the actual MMSE operation and LMS algorithm are performed to update the tap coefficients of the EqFilter 122 and may be implemented by a digital signal processing block (or chip) separately from other components of the receiver independent of operation clocks (sampling and symbol rate) to perform a serial multiplication at a high speed for performance of the equalization process. The filter update processing unit 150* interrupts the EqFilter every time the required operation is completed to update the tap coefficients of the EqFilter (see if (Equalizerupdate==1)).

For example, the buffer 151 serially receives the symbols configured of the 2 oversamples from the EqFilter and stores and delays the received symbols for the update operation time and transfers the symbols to the equalizer tap coefficient update unit 152 by a first input first output (FIFO) scheme.

An EqFilter_image 157 of the equalizer tap coefficient update unit 152 is an equalizer which performs the equalization of the frequency band characteristics on the transferred symbols (or signals) by the FIR filtering based on the feedforward scheme depending on the actual MMSE operation and LMSE algorithm, similar to the EqFilter 122. An update interrupt request unit (update IR) 158 calculates the error $\epsilon_n$ for the data output from the EqFilter_image 157 and updates the tap coefficients of the EqFilter based on the operation of the above Equation 2 to inform the EqFilter_image 157 and the EqFilter 122 of it. The EqFilter_image 157 and the EqFilter 122 use the updated tap coefficients to perform the equalization process.

The control of the switching between the blind mode (non data-aided mode) such as the CMA algorithm and the data-aided (DA) mode (mode using the previously known data (or symbol) configured of the appropriate training sequence instead of the $R_c^2$ in the error $\epsilon_n$) in the update IR 158 is performed by the Ref symbol control unit 153. For example, when the header detection and receiver state machine unit 133 uses the frame start point and the physical layer (PL) header information recognized by the MODCOD to generate the predetermined enable signal, the Ref symbol control unit 153 transfers a reference symbol of which the predetermined reference symbol is adjusted as known data which is used to calculate the error $\epsilon_n$ for switching from the blind mode (non data-aided mode) to the data-aided (DA) mode to the update IR 158 to switch the blind mode to the DA mode. To this end, a signal level/phase shifter 159 of the Ref symbol control unit 153 uses the output of the second level control unit 132 and a phase adjust signal of the header detection and receiver state machine unit 133 to transfer the level of the predetermined Ref symbol received from the header detection and receiver state machine unit 133 and the phase-adjusted reference symbol to the update IR 158.

Figure 3:
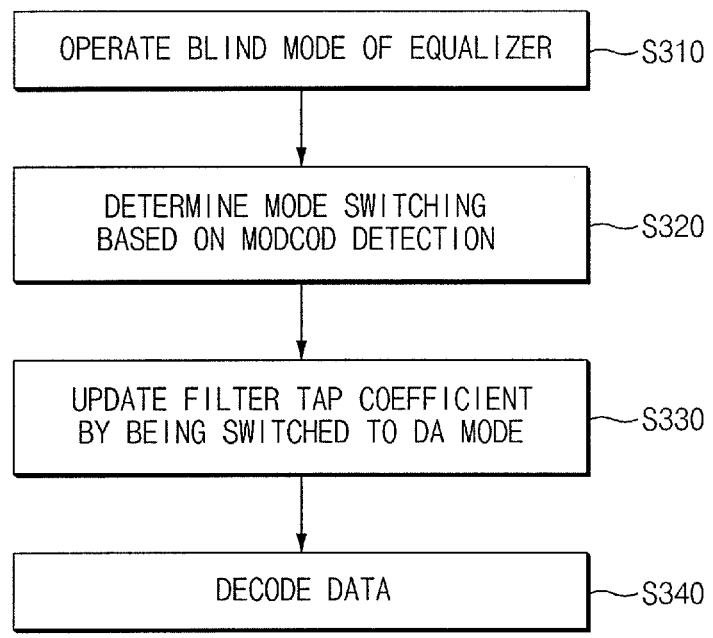
FIG. 3 is a flow chart for describing an operation of the communication apparatus for satellite service according to an exemplary embodiment of the present invention.

As described above, the communication apparatus 100 for receiving a satellite signal for satellite service according to the exemplary embodiment of the present invention first uses the tap coefficients updated to the blind mode (non data-aided mode) by the filter update processing unit 150 to perform the equalization of the frequency band characteristics on a symbol stream configured of two fractional spaced samples per symbol under the VCM or ACM environment in which the frame length and the modulation scheme are changed in each frame unit so as to make the equalizer 120 improve the inter-symbol interference and the distortion such as noise (see S310 of FIG. 3). Next, the receiving state estimation unit 130 performs the frame synchronization, the carrier synchronization by the calculation of the initial carrier frequency error, the phase error, and the like, the detection of the MODCOD included in the PLS information, and the like to understand the modulation scheme, the frame length, and the like based on the detected MODCOD and then uses the recognized frame start time and other PL header information to control the equalizer 120 to be operated depending on the DA mode LMS algorithm at the corresponding synchronization timing (see S320 of FIG. 3), such that the PL header information, the data, and the like may be more precisely decoded depending on the update of the tap coefficient (see S330 of FIG. 3). Here, when the pilot symbol is present, the synchronization timing may be calculated using the pilot symbol instead of the PL header information, or otherwise only the PL information may be used. After the synchronization is performed, while the frame processor 140 performs the data decoding process in the data interval of the remaining slots, the equalizer 120 is operated in the sleep mode which is operated without the update of the filter tap coefficient by the filter update processing unit 150 (see S340 of FIG. 3). The process may be repeated at a predetermined period, for example, at each frame.

Figure 4:
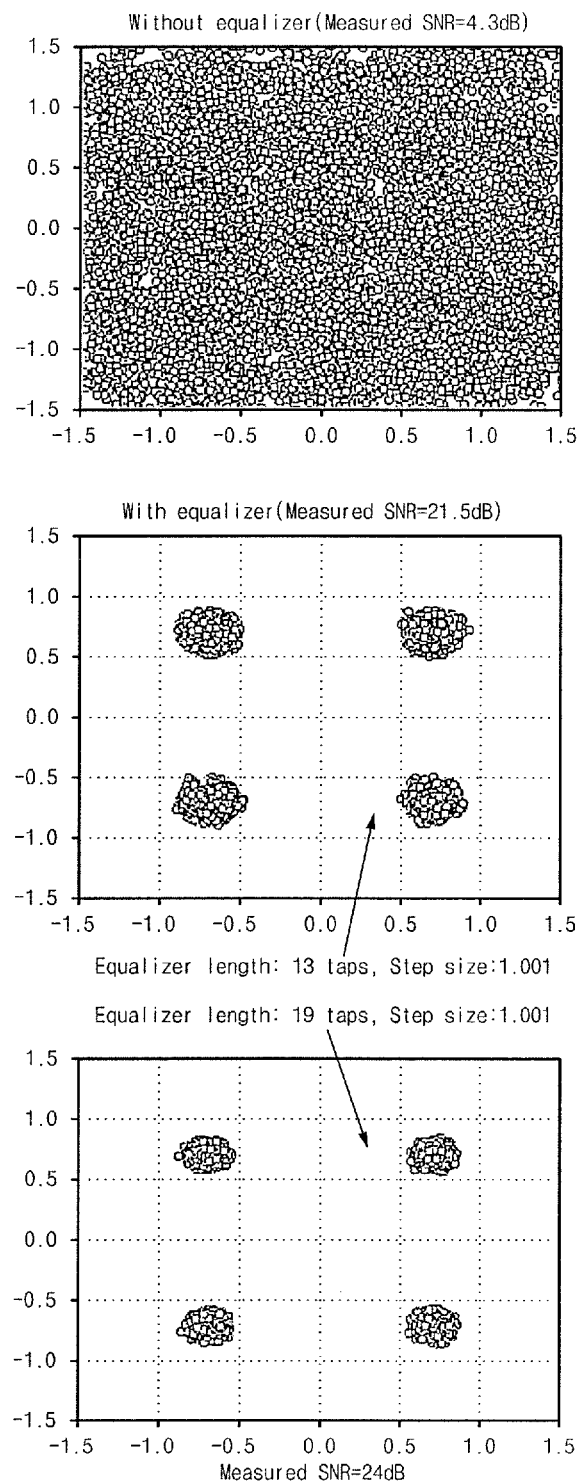
FIG. 4 is a comparison exemplified diagram for QPSK constellations in the case in which an equalizer structure according to an exemplary embodiment of the present invention is not present and is present, when inter-symbol interference is present.

Depending on the operation of the equalizer structure, such as the EqFilter 122 and the equalizer tap coefficient update unit 152 of the communication apparatus 100 according to the exemplary embodiment of the present invention, even in the environment in which the inter-channel interference is present, as illustrated in the example of the QPSK constellation of FIG. 4, even though the number of filter taps of the EqFilter 122 and the EqFilter_image 157 are reduced to 13 taps unlike the conventional 19 taps, it is confirmed that the normal quadrature phase shift keying (QPSK) signal may be transmitted and received. FIG. 4 illustrates an example in which the roll off (RO) (see Equation 1) is 0.05.

Figure 5:
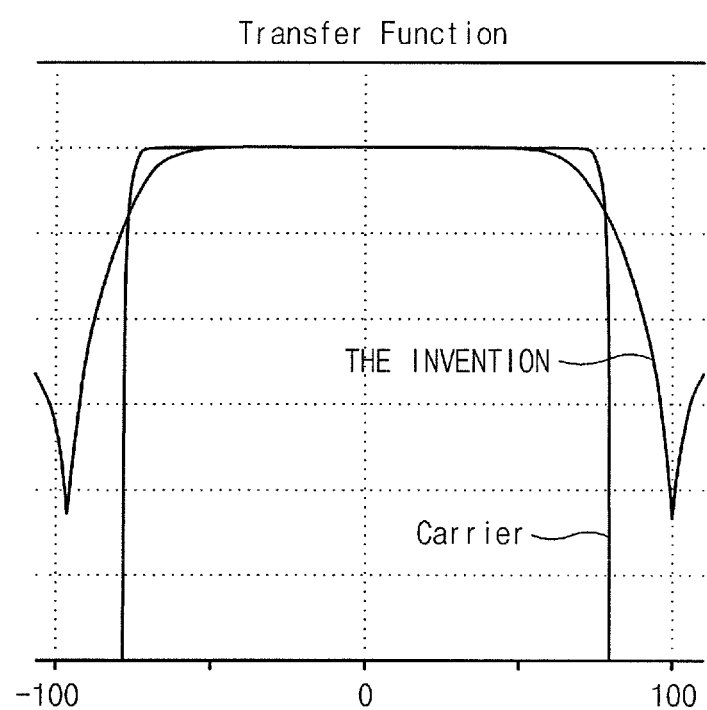
FIG. 5 is a diagram illustrating a carrier spectrum of a satellite signal and a transfer function characteristic of a bandwidth limiting filter of a transponder and is a graph of the QPSK constellation in the case in which the equalizer structure according to an exemplary embodiment of the present invention is required.

FIG. 5 illustrates a carrier spectrum (roll off of 0.05) of the satellite signal and the transfer function characteristics of the band limiting filter in the transponder with which the communication apparatus according to the exemplary embodiment of the present invention may be equipped. Generally, the carrier signal in an edge portion of a band may be distorted by the general transponder. However, when the equalizer structure according to the exemplary embodiment of the present invention is applied, as illustrated in the graph of FIG. 5, a −3 dB bandwidth of the band limiting satellite transponder filter which is about 130 MHz is close to 140 MHz of a −3 dB bandwidth of the carrier signal, and thus the inter-symbol interference is removed depending on the equalizer structure according to the exemplary embodiment of the present invention to improve the SNR, thereby increasing the symbol rate compared to the bandwidth.

Figure 6:
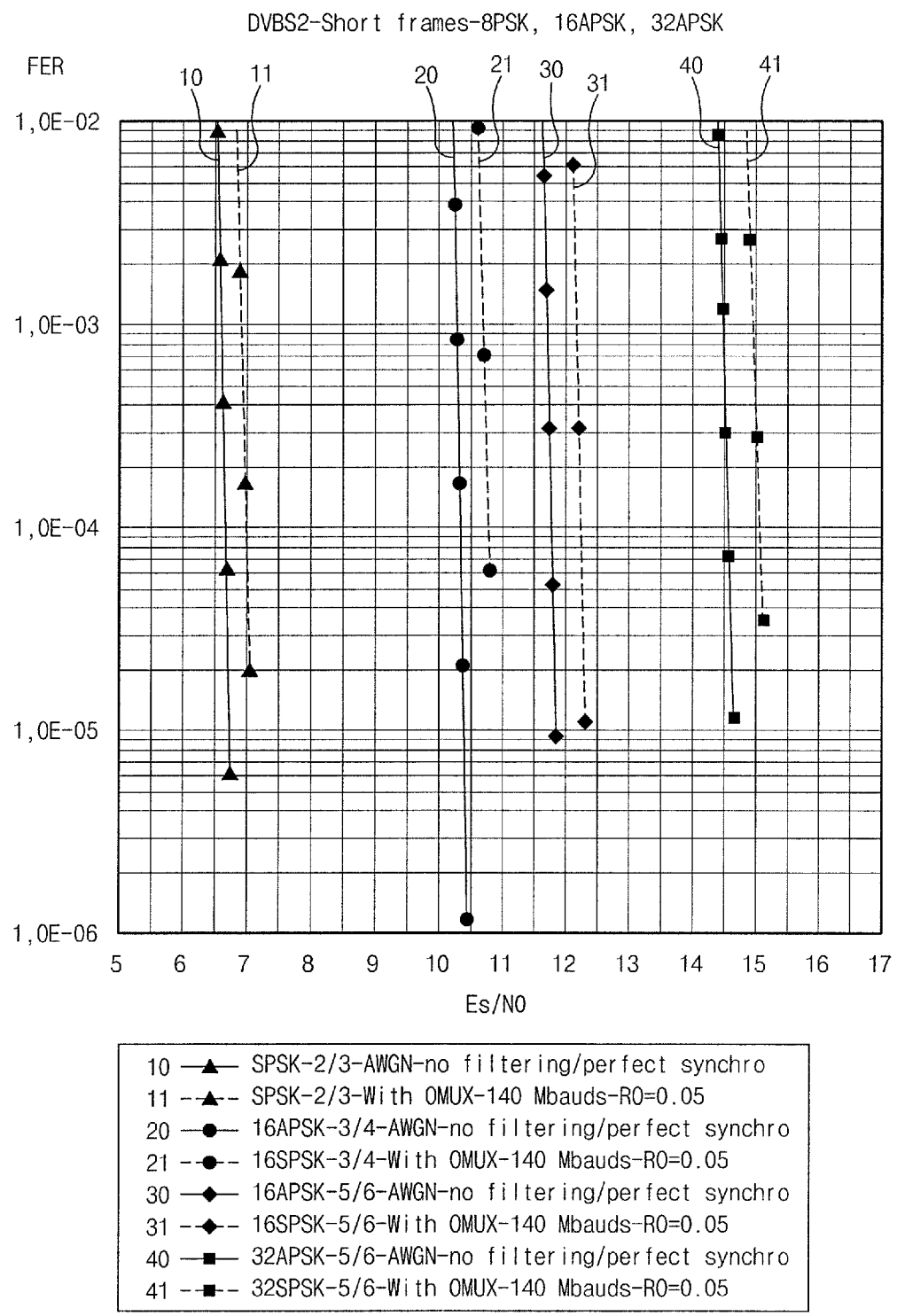
FIG. 6 is a graph for describing performance improvement of a frame error rate in the case in which the equalizer structure according to an exemplary embodiment of the present invention is present.

Further, as illustrated in the graph of FIG. 6 for the performance of a frame error rate (FER) in the case in which the equalizer structure according to the exemplary embodiment of the present invention is present, it may be confirmed that the communication apparatus including the equalizer is operated within a loss less than 0.5 dB compared to ideal AWGN channel environment in various modulation schemes such as 8PSK, 16APSK, and 32APSK. In addition to the PSK and the APSK which are the modulation scheme mentioned herein, in some cases, various modulation schemes such as QAM, FSK, GFSK, VSB, MSK, and GMSK may be used.

Figure 7:
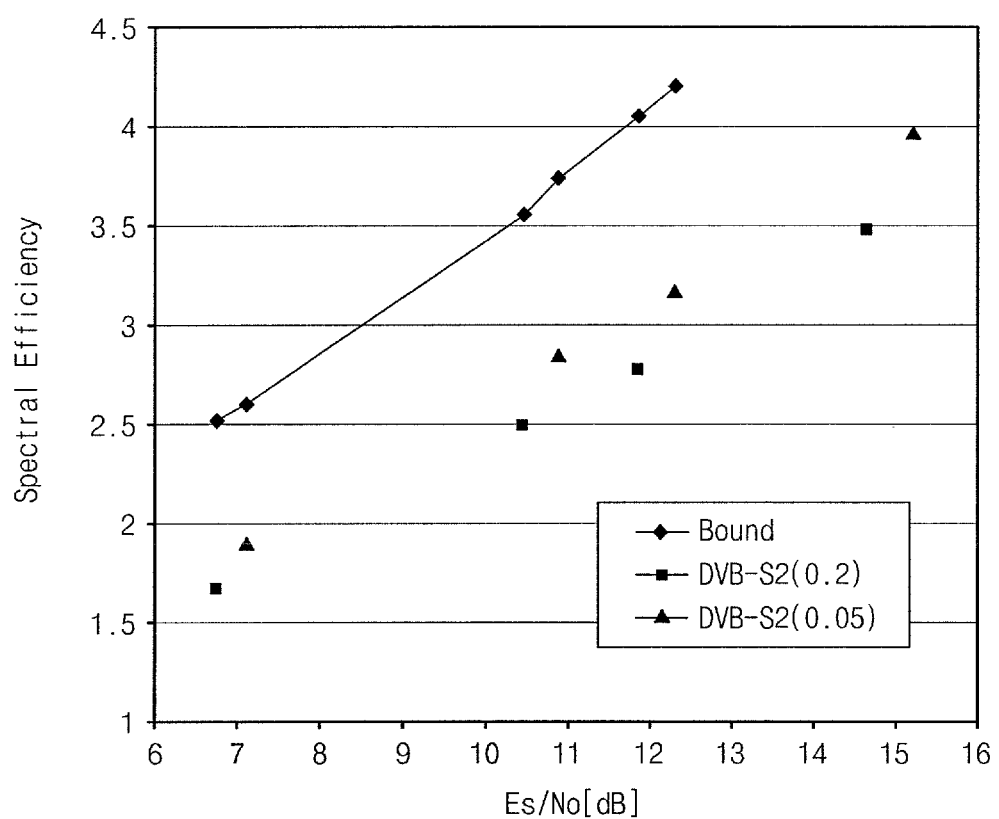
FIG. 7 is a graph for describing spectral efficiency per bandwidth in the case in which the equalizer structure according to an exemplary embodiment of the present invention is present.

FIG. 7 is a graph for describing the spectral efficiency per bandwidth in the case in which the equalizer structure according to an exemplary embodiment of the present invention is present. As illustrated in FIG. 7, when a small roll off (RO)=0.05 is introduced, it may be confirmed that the spectral efficiency per bandwidth compared to RO=0.2 which is a digital video broadcasting (DVB)-S2 (or DVB-S2x) standard is improved as much as about 10%. It is shown that the spectral efficiency of a bound data of FIG. 6 is more improved according to the environment.

The communication apparatus 100 according to the exemplary embodiment of the present invention may be applied to all the digital communication devices, but for example, is applied to a DVB-S2 (or DVB-S2x) standard transmitting/receiving modem to be able to effectively remove the distortion or the inter-symbol interference of the satellite service signal through the satellite broadcasting or communication and improve the transmitting/receiving frequency efficiency or the spectral efficiency (S.E) of the satellite signal per bandwidth. That is, in the viewpoint of the bandwidth of 3 dB, the inter-symbol interference is removed depending on the equalizer structure according to the exemplary embodiment of the present invention, for example, having the roll off (RO) between 0 and 0.2 in the channel of the case in which the bandwidth of the transmission signal carrier compared to the bandwidth of the satellite transponder filter is a slight large (when the small roll off is applied), thereby improving the SNR and increasing the symbol rate (see the RS of the above Equation 1) compared to the bandwidth (see the W of the above Equation 1). Further, the signal distortion is corrected in a channel in which the linear distortion characteristics of the filter pass in the filter such as the transponder is serious, thereby improving the SNR and increasing the symbol rate.

The present invention has been described by specified matters such as specific components and limited exemplary embodiments and drawings in the exemplary embodiment of the present invention as described above, this is just provided to assist more overall appreciation and the present invention is not limited to the exemplary embodiment. Various modifications and transforms can be made by those skilled in the art within the scope without departing from an essential characteristic of the present invention. The spirit of the present invention is defined by the appended claims rather than by the description preceding them, and the claims to be described below and it should be appreciated that all technical spirit which are evenly or equivalently modified are included in the claims of the present invention.

What is claimed is:

1. A communication apparatus, comprising:
a first equalizer configured to receive an oversampled sample to perform equalization of a frequency band based on a finite impulse response (FIR) filtering and output a decimated sample;
a receiving state estimation unit configured to receive the decimated sample to detect information of a transmission scheme and generate a mode switching signal at a synchronization timing depending on a corresponding modulation scheme and a frame length; and
a filter update processing unit configured to allow a separate second equalizer to receive the oversampled sample from the first equalizer to perform the equalization of the frequency band and use data output from the separate second equalizer to update tap coefficients for the FIR filtering, provide the updated tap coefficients to the first equalizer and switch from a blind mode to a data-aided (DA) mode depending on the mode switching signal to perform the update of the tap coefficients.

2. The apparatus of claim 1, wherein in the viewpoint of a 3 dB bandwidth, the communication apparatus corrects a signal distortion to increase a symbol rate, in a channel using a band in which a bandwidth of a transmission signal carrier is larger than a bandwidth of a filter to which the communication apparatus is applied in a predetermined range or a channel in which a carrier signal is distorted by filter pass.

3. The apparatus of claim 2, wherein the filter is a satellite transponder filter and the predetermined range includes a range in which a roll off (RO) for a bandwidth W and a symbol rate Rs of a carrier in W=Rs*(1+RO) where RO is set to be 0 to 0.2.

4. The apparatus of claim 1, wherein information on the transmission scheme is modulation code rate (MODCOD) information.

5. The apparatus of claim 1, wherein the communication apparatus receives a satellite signal in variable coding and modulation (VCM) or adaptive coding and modulation (ACM) environment.

6. The apparatus of claim 1, wherein the filter update processing unit is implemented by a separate digital signal processing (DSP) chip.

7. The apparatus of claim 1, wherein the oversampled sample is configured of two oversamples per symbol and the decimated sample is configured of 1 sample per symbol.

8. The apparatus of claim 1, wherein the filter update processing unit includes:
   an update interrupt request (IR) unit configured to calculate an error corresponding to an error between an output of the second equalizer and an output signal power value to update the tap coefficients in a corresponding one of the blind mode and the DA mode; and
   a reference (Ref) symbol control unit configured to allow the update IR to provide data to be used for the calculation of the error in the DA mode.

9. The apparatus of claim 8, wherein the Ref symbol control unit includes a level and phase shifter configured to provide the data generated by shifting a level and a phase of a reference symbol depending on a control signal generated based on the decimated sample in the receiving state estimation unit.

10. The apparatus of claim 1, wherein the communication apparatus is applied to a digital video broadcasting (DVB) modem including a DVB-S2 or a DVB-S2x.

11. A signal receiving method of a communication apparatus, comprising:
   receiving, by a first equalizer, an oversampled sample to perform equalization of a frequency band based on a finite impulse response (FIR) filtering and output a decimated sample;
   receiving, by a receiving state estimation unit, the decimated sample to detect information of a transmission scheme and generating a mode switching signal at a synchronization timing depending on a corresponding modulation scheme and a frame length; and
   performing, by a separate second equalizer receiving the oversampled sample from the first equalizer, equalization of the frequency band and using data output from the separate second equalizer to update tap coefficients for the FIR filtering, providing the updated tap coefficients to the first equalizer and switching from a blind mode to a data-aided (DA) mode depending on the mode switching signal to perform the update of the tap coefficients.

12. The method of claim 11, wherein in the viewpoint of a 3 dB bandwidth, the communication apparatus corrects a signal distortion to increase a symbol rate in a channel using a band in which a bandwidth of a transmission signal carrier is larger than a bandwidth of a filter to which the communication apparatus is applied in a predetermined range or a channel in which a carrier signal is distorted by filter pass.

13. The method of claim 12, wherein the filter is a satellite transponder filter and the predetermined range includes a range in which a roll off (RO) for a bandwidth W and a symbol rate Rs of a carrier in $W=Rs*(1+RO)$ where RO is set to be 0 to 0.2.

14. The method of claim 11, wherein information on the transmission scheme is modulation code rate (MODCOD) information.

15. The method of claim 11, wherein the communication apparatus receives a satellite signal in variable coding and modulation (VCM) or adaptive coding and modulation (ACM) environment.

16. The method of claim 11, wherein the oversampled sample is configured of two oversamples per symbol and the decimated sample is configured of 1 sample per symbol.

17. The method of claim 11, wherein in the performing of the update of the tap coefficients,
   an error corresponding to an error between an output of the second equalizer and an output signal power value is calculated to update the tap coefficients in a corresponding one of the blind mode and the DA mode; and
   data generated by shifting a level and a phase of a reference symbol depending on a control signal generated based on the decimated sample is used for the calculation of the error to update the tap coefficients in the DA mode.

* * * * *